(12) United States Patent
Morales Franqui

(10) Patent No.: US 9,163,608 B2
(45) Date of Patent: Oct. 20, 2015

(54) DOUBLE TUNNEL WIND TURBINE

(76) Inventor: Jose E Morales Franqui, Wolcott, CT (US)

( * ) Notice: Subject to any disclaimer, the term of this patent is extended or adjusted under 35 U.S.C. 154(b) by 538 days.

(21) Appl. No.: 13/575,000

(22) PCT Filed: May 3, 2011

(86) PCT No.: PCT/US2011/000766
§ 371 (c)(1),
(2), (4) Date: Jul. 24, 2012

(87) PCT Pub. No.: WO2012/150915
PCT Pub. Date: Nov. 8, 2012

(65) Prior Publication Data
US 2012/0328425 A1     Dec. 27, 2012

(51) Int. Cl.
*F03D 1/02* (2006.01)
*F03D 1/04* (2006.01)
(52) U.S. Cl.
CPC *F03D 1/04* (2013.01); *F03D 1/025* (2013.01); *F05B 2240/121* (2013.01); *F05B 2240/13* (2013.01); *F05B 2240/131* (2013.01); *Y02E 10/72* (2013.01)

(58) Field of Classification Search
USPC ............. 415/4.3, 4.5, 219.1, 909, 908, 199.4; 290/44, 55
See application file for complete search history.

(56) References Cited

U.S. PATENT DOCUMENTS

| | | | |
|---|---|---|---|
| 4,781,522 A * | 11/1988 | Wolfram | 415/1 |
| 8,269,368 B2 * | 9/2012 | White | 290/55 |
| 2008/0170941 A1 * | 7/2008 | Ghosh et al. | 416/121 |

* cited by examiner

Primary Examiner — Christopher Verdier
Assistant Examiner — Justin Seabe
(74) Attorney, Agent, or Firm — Robert S. Smith

(57) ABSTRACT

A wind turbine apparatus includes a shaft carrying a plurality of rotor wheels fixed at axially spaced intervals. Each rotor wheel includes buckets at the periphery thereof. First and second generally cylindrical housing are disposed in concentric relationship to define a blind annular chamber surrounding the rotor wheels that directs ambient winds to through the inner wall of the inner cylindrical housing to the periphery of the respective rotor wheels. One extremity of the blind annular chamber is open for receiving ambient air flow and a second axial extremity proximate is closed, whereby axial airflow into the annular chamber is substantially directed in a radial direction toward the buckets carried on the rotor wheels to cause rotation of the shaft.

20 Claims, 13 Drawing Sheets

DOUBLE TUNNEL WIND TURBINE

CROSS-REFERENCE TO RELATED APPLICATIONS

This application contains subject matter which is related to the subject matter of the PCT application PCT/US2011/000766 having an international filing date of May 3, 2011 and filed by the same inventor. The priority of that application is claimed.

TECHNICAL FIELD

The present invention relates generally to wind turbines and more specifically to horizontal axis wind turbines for the generation of electricity from the power of the wind. Wind-generated electrical energy is renewable, produces no emissions, and is generally environmentally clean technology.

BACKGROUND OF THE INVENTION

Wind turbines have been used by humans for a long time. As early the 17th century B.C. it is said that King Hammurabi organized a system of wind power devices having a vertical axis for irrigation and grinding grain. Over time the turbines have improved. Wind turbines have also been proposed with different shapes and forms. However the vast majority of these designs for various reasons prove to be inefficient.

The most common wind turbine structure is the horizontal axis wind turbine having long blades. Such horizontal axis wind turbines are inefficient because such mechanisms essentially only harvest the wind energy from winds in a direction that is aligned with the axis of the shaft. Such windmills require large towers placed at high altitude for greatest efficiency.

Other turbine designs have been proposed including those with a vertical axis. These have mostly proven to be inefficient because only a portion of the turbine receives wind power at any given time. Because of the noted issues, it is apparent that there exists a need in the art to overcome the deficiencies and limitations described herein and above. The present invention provides a wind turbine with a novel construction that helps reduce or eliminate these difficulties mentioned above.

Horizontal axis wind turbines with tall towers and long blades are difficult to transport. They are also expensive to build and to transport. Transportation to the operational site may cost as much 20% of the equipment cost. The tall towers and long blades also make these turbines difficult to install and require powerful cranes and skilled operators. Also, such devices produce noise that annoys those who live in surrounding areas where these structures are placed and may even affect radar at airports. Accordingly, such devices require careful monitoring; otherwise they are prone to material fatigue and structural damage. Wind energy facilities can adversely impact wildlife, especially birds and bats, and their habitats.

SUMMARY OF THE INVENTION

Accordingly, it is an object of the present invention to provide apparatus that is relatively easy to move and to install.

It is another object of the present invention to provide apparatus that minimizes the operational noise.

It is yet another object of the present invention to provide apparatus that avoids issues with material fatigue and structural failure as the result of the fatigue.

It is a still further object of the present invention to provide apparatus that provides less aesthetic impact than other wind powered apparatus such the apparatus with long blades and a horizontal axis that are often installed on high towers at the highest elevation possible for any given area.

It is still another object of the present invention to provide apparatus that will reduce the impact on wildlife.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

The shortcomings of the prior art are overcome and additional advantages are provided in a wind turbine apparatus which includes an elongated shaft; and a plurality of rotor wheels fixed to the shaft at axially spaced intervals, each rotor wheel includes first and second opposed circular walls and a plurality of scoop members carried between the opposed circular walls at angular intervals throughout the circumferential extent of each rotor wheel. A first generally cylindrical housing is disposed in concentric relationship with the periphery of the rotor wheels and the elongated shaft, the first generally cylindrical housing having a first axial extremity and a second axial extremity and the first generally cylindrical housing comprising a plurality of passageways, each of the passageways being disposed in registered relationship with one of the rotor wheels; and a second generally cylindrical housing disposed outside of the first generally cylindrical housing as well as disposed in substantially concentric relationship with the shaft and the first generally cylindrical housing, the second generally cylindrical housing having a first axial extremity and a second axial extremity, and the first and second generally cylindrical housings defining an annular chamber therebetween, the annular chamber having a first axial extremity, proximate to the respective first axial extremities of the first and second generally cylindrical housings, that is open for receiving ambient air flow and a second axial extremity proximate to the respective second axial extremities of the first and second cylindrical housings that is closed, whereby axial airflow into the annular chamber is substantially directed in a radial direction by the cup shaped surfaces toward the scoop members carried on the rotor wheels to cause rotation of the shaft.

In some embodiments each of the rotor wheels has structure at the geometric center thereof that allows passage of air flow from the scoop members axially with respect to the axes of rotation of the rotor wheels. The first axial extremity of the first generally cylindrical housing may be closed to prevent airflow in or out of the first cylindrical member. The housing may be closed by a conical member that directs incoming airflow toward the annular chamber.

The second axial extremity of the first generally cylindrical housing is open to allow airflow out of the first cylindrical member in some embodiments.

Other forms of the wind turbine apparatus which include an elongated shaft; a plurality of rotor wheels fixed to the shaft at axially spaced intervals, each rotor wheel including first and second opposed circular walls and a plurality of scoop members carried between the opposed circular walls at angular intervals throughout the circumferential extent of each rotor wheel; a first generally cylindrical housing disposed in concentric relationship with the periphery of the rotor wheels and the elongated shaft, the first generally cylindrical housing having a first axial extremity and a second axial extremity the first generally cylindrical housing including ports dimensioned and configured to direct air flow toward respective rotor wheels; and a second generally cylindrical housing disposed outside of the first generally cylindrical housing as well as disposed in substantially concentric relationship with the shaft and the first generally cylindrical housing, the second generally cylindrical housing having a first axial extremity and a second axial extremity, and the first and second generally cylindrical housings defining an annular chamber therebetween, the annular chamber having a first axial extremity, proximate to the respective first axial extremities of the first and second generally cylindrical housings, that is open for receiving ambient air flow and a second axial extremity proximate to the respective second axial extremities of the first and second cylindrical housings that is closed, whereby axial airflow into the annular chamber is substantially directed in a radial direction by the cup shaped surfaces toward the scoop members carried on the rotor wheels to cause rotation of the shaft.

In some embodiments the wind turbine apparatus each of the rotor wheels has structure at the geometric center thereof that allows passage of air flow from the scoop members axially with respect to the axes of rotation of the rotor wheels. The first axial extremity of the first generally cylindrical housing may be closed to prevent airflow in or out of the first axial extremity of the first cylindrical member. The first axial extremity of the first generally cylindrical housing is closed by a conical member that directs incoming airflow toward the annular chamber in some embodiments. The second axial extremity of the first generally cylindrical housing is open to allow airflow out of the first cylindrical member in some embodiments.

The first generally cylindrical housing comprises an assembly of axially adjacent cylindrical sections that are fixed together in some forms of the invention. Each of the cylindrical sections have substantially identical outside diameters in some forms of the invention. The outside diameters of respective cylindrical sections may progressively increase with the smallest being proximate the first axial extremity of the annular chamber and the largest being proximate the second axial extremity of the annular chamber.

Each rotor wheel may have the same diameter in some embodiments of the invention and a plurality of the cylindrical sections may be dimensioned, configured and mounted to align with respective rotor wheels. In some embodiments a plurality of the cylindrical sections are dimensioned, configured and mounted to align with respective rotor wheels of the plurality of rotor wheels and the plurality of cylindrical sections are dimensioned and configured to define apertures therein that surrounds respective rotor wheels.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings of embodiments of the double tunnel wind turbines in accordance with the present invention in which:

DETAILED DESCRIPTION

Figure 1:
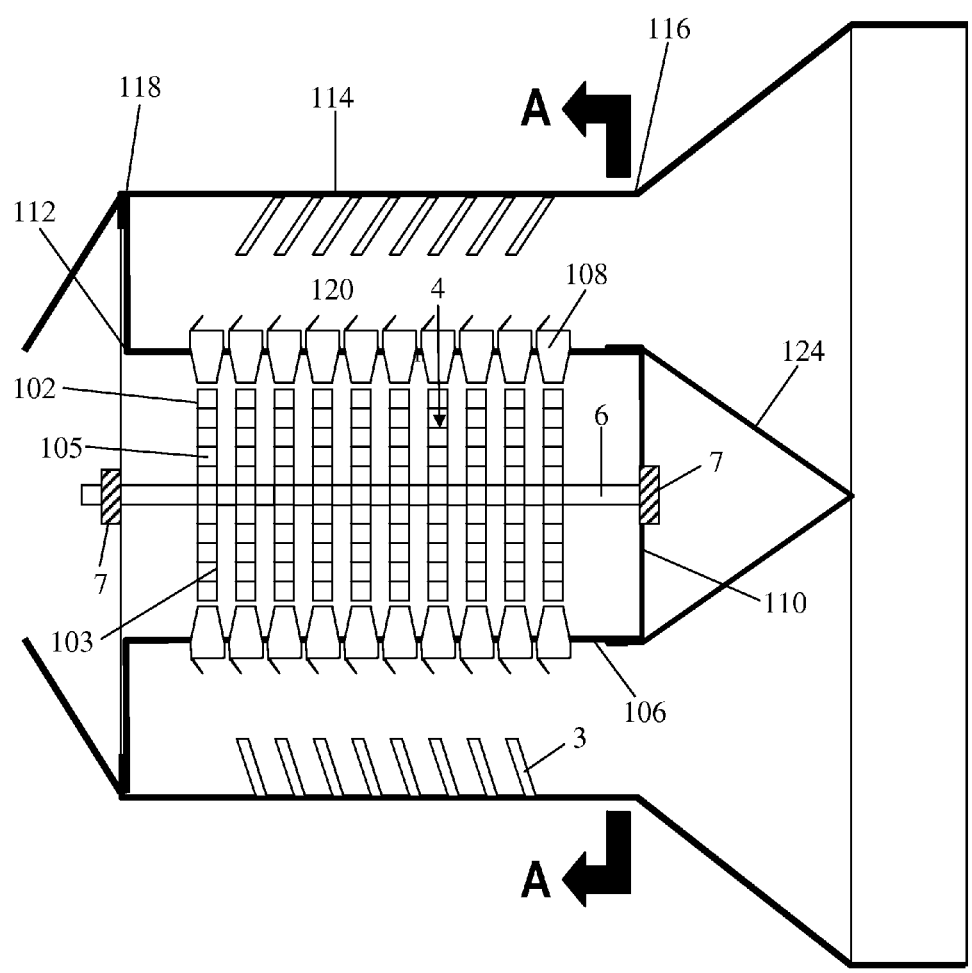
FIG. 1 is sectional view taken along the axis of a first embodiment of the present invention illustrating a principal tunnel, a secondary tunnel as well as a rotor and stator.
Figure 2:
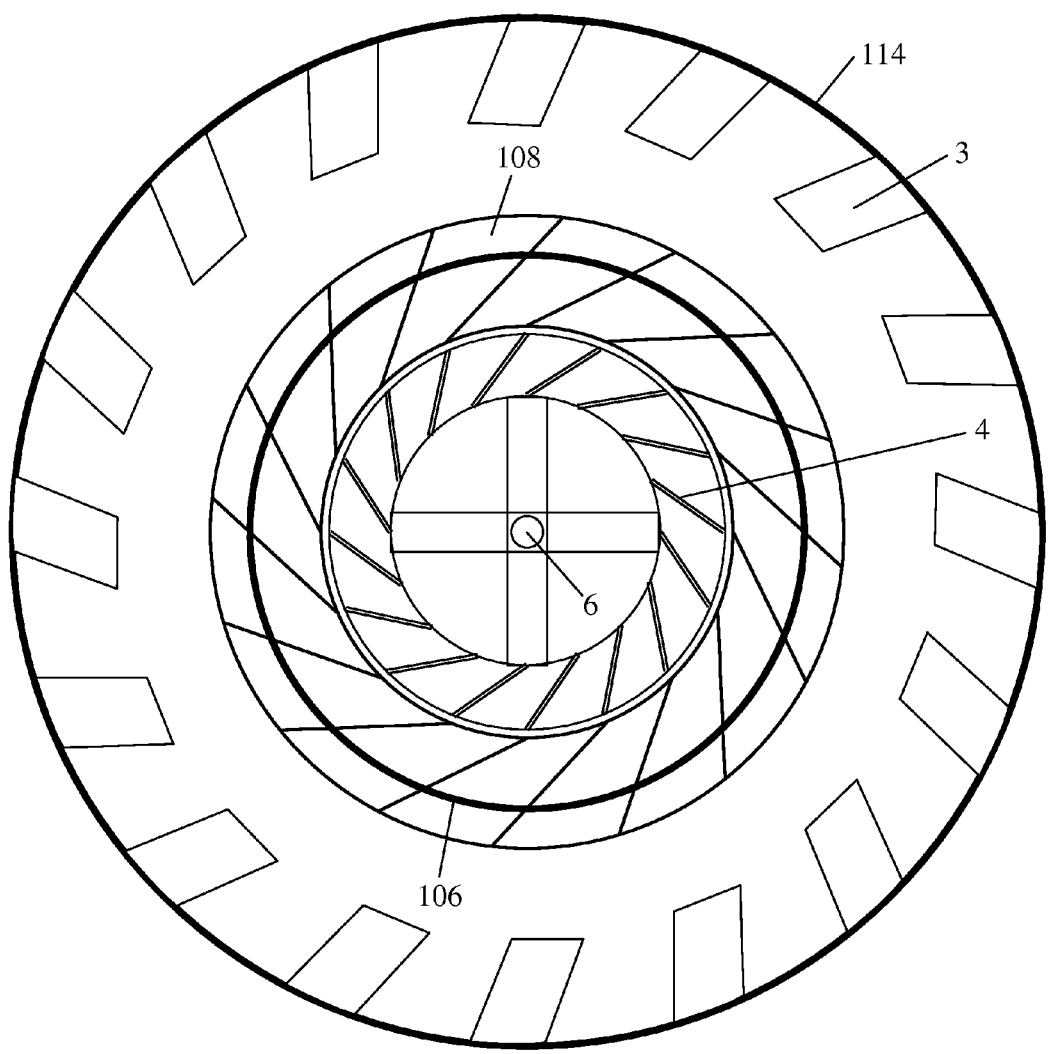
FIG. 2 is a sectional view taken along the line A-A in FIG. 1 that illustrates the relationship between the principal tunnel, the secondary tunnel, the vanes that deflect airflow, the wheels, the channels and the axle.

A first embodiment of the present invention will be better understood by reference to FIGS. 1-5 wherein there is shown a wind turbine apparatus which includes an elongated shaft 6. A plurality of rotor wheels 4 are fixed to the shaft 6 at axially spaced intervals. Each rotor wheel 4 includes first and second opposed circular walls 102, 103 and a plurality of scoop members 105 carried between the opposed circular walls 102, 103 at angular intervals throughout the circumferential extent of each rotor wheel.

A first generally cylindrical housing 106 is disposed in concentric relationship with the periphery of the rotor wheels 4 and the elongated shaft 6. The first generally cylindrical housing 106 has a first axial extremity 110 and a second axial extremity 112 and the first generally cylindrical housing 106 comprises a plurality of cup shaped surfaces 108. Each cup shaped surface 108 is dimensioned and configured to align with the periphery of one of the rotor wheels 4.

A second generally cylindrical housing 114 has a still greater diameter and is also disposed in substantially concentric relationship with the shaft 6 as well as the first generally cylindrical housing 106. The second generally cylindrical housing 114 has a first axial extremity 116 and a second axial extremity 118. The first and second generally cylindrical housings 106, 114 define an annular chamber 120 therebetween. The annular chamber 120 has a first axial extremity, proximate to the respective first axial extremities 110, 116 of the first and second generally cylindrical housings 106, 114, that is open for receiving ambient air flow and a second axial extremity proximate to the respective second axial extremities 112, 118 of the first and second cylindrical housings 106, 114 that is closed, whereby axial airflow into the annular chamber 120 is substantially directed in a radial direction by the cup shaped surfaces 108 toward the scoop members 105 carried on the rotor wheels 4 to cause rotation of the shaft 6.

In some embodiments of the the wind turbine apparatus in accordance with the present invention, each of the rotor wheels 4 has structure at the geometric center thereof that allows passage of air flow from the scoop members 105 axially with respect to the axes of rotation of the rotor wheels 4. See FIG. 2 and bore 6. The wind turbine apparatus in some embodiments has a first axial extremity 110 of the first generally cylindrical housing 106 that is closed to prevent airflow in or out of the first cylindrical member.

More specifically, the wind turbine apparatus has, a first axial extremity 110 of a first generally cylindrical housing 106 that is closed by a conical member 124 that also directs incoming airflow toward the annular chamber 120. In the illustrated first embodiment, the second axial extremity 112 of the first generally cylindrical housing 106 is open to allow airflow out of the first generally cylindrical housing 106.

Figure 3:
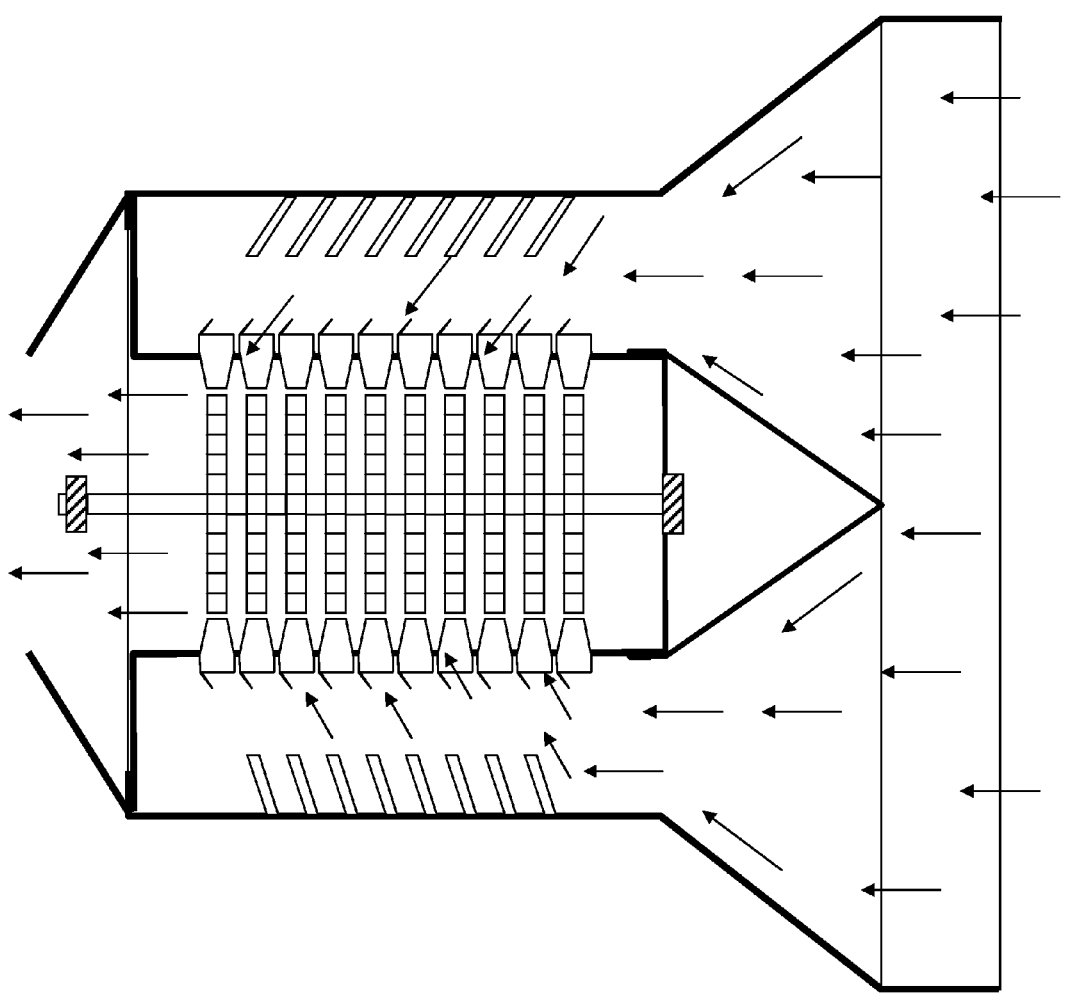
FIG. 3 is a diagrammatic view similar to FIG. 1 illustrating the air flow paths of air entering the apparatus as well as through the apparatus.
Figure 4:
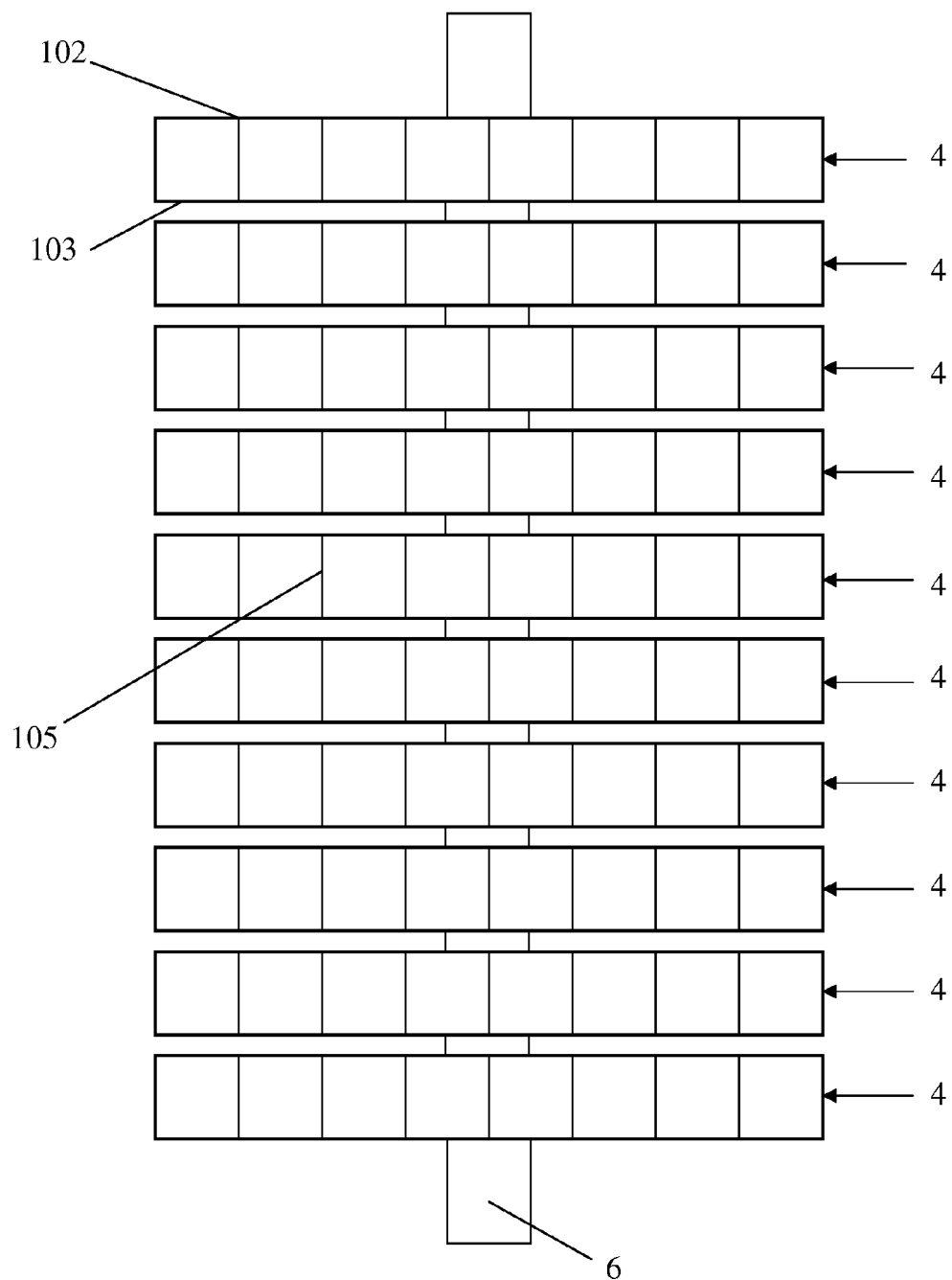
FIG. 4 is a diagrammatic view of the rotor assembly that includes a cylindrical envelope assembly of a plurality of rotor wheels that each include blades defining air pockets.
Figure 5:
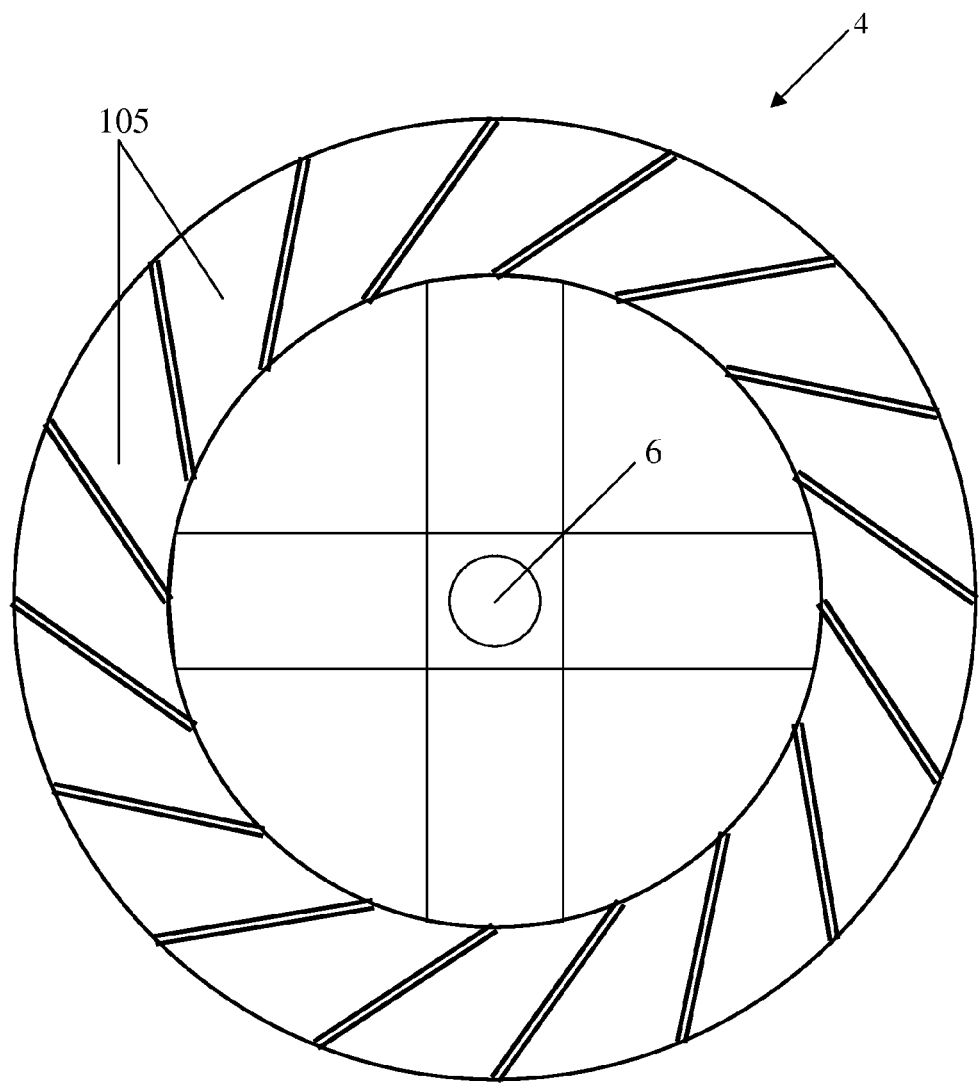
FIG. 5 is a front view of one the respective wheels show in FIG. 4 where the air pockets of air are better shown together with the axle and the opening in the center for return air flow.
Figure 6:
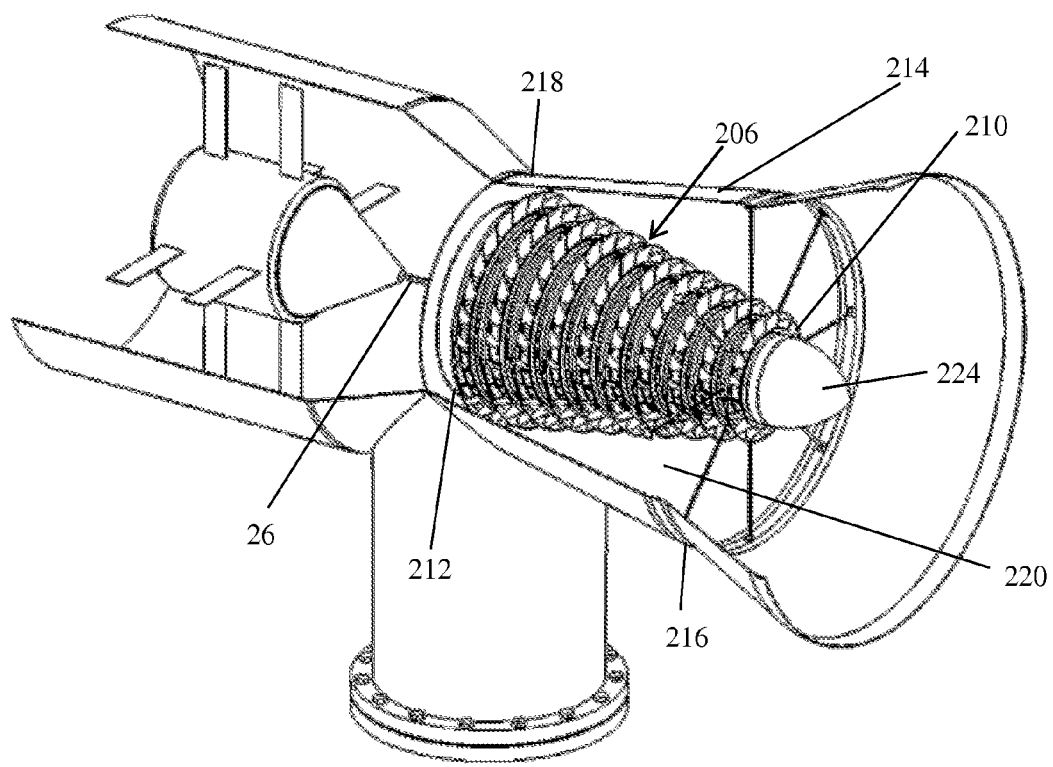
FIG. 6 is a perspective view of a second embodiment of the present invention wherein the assembly of rotors and stators collectively have a truncated conical envelope instead of a cylindrical envelope.
Figure 7:
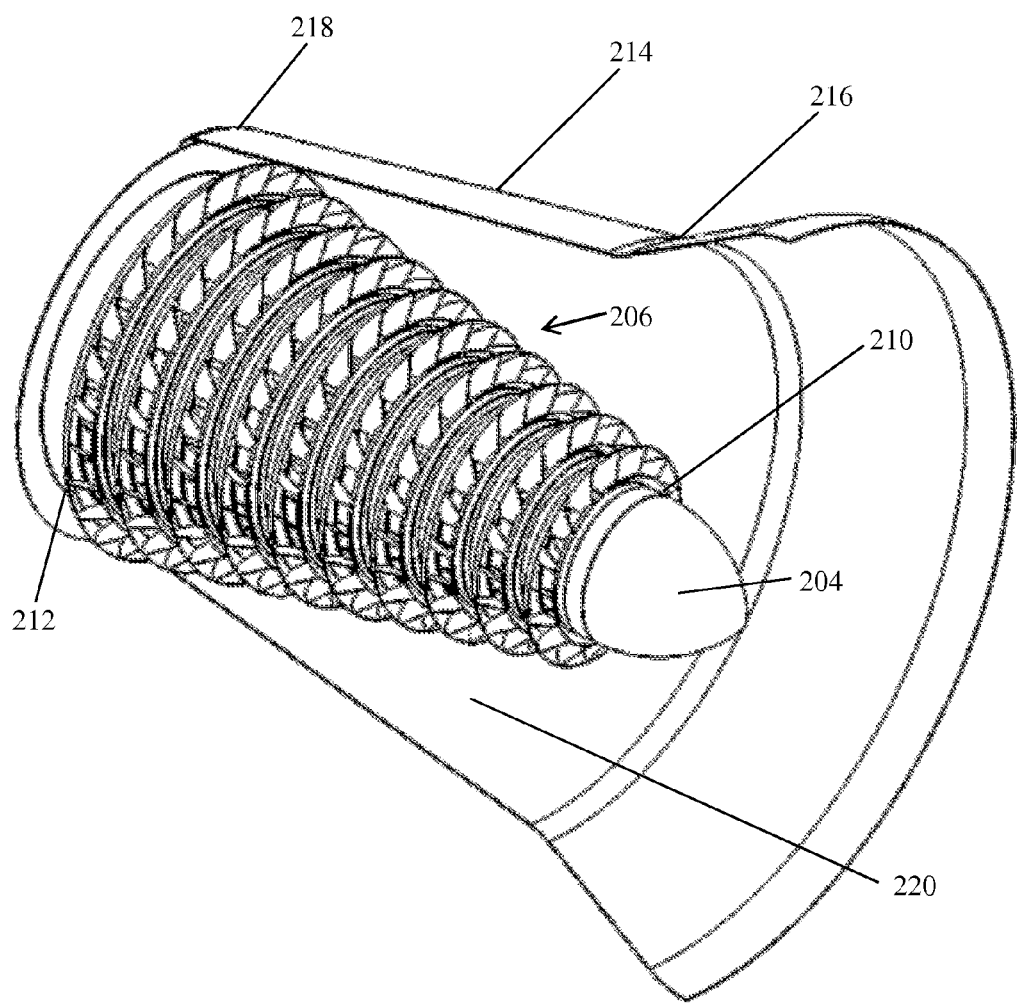
FIG. 7 is a perspective view showing in greater detail of the assembly of rotors and stators in the embodiment in FIG. 6.
Figure 8:
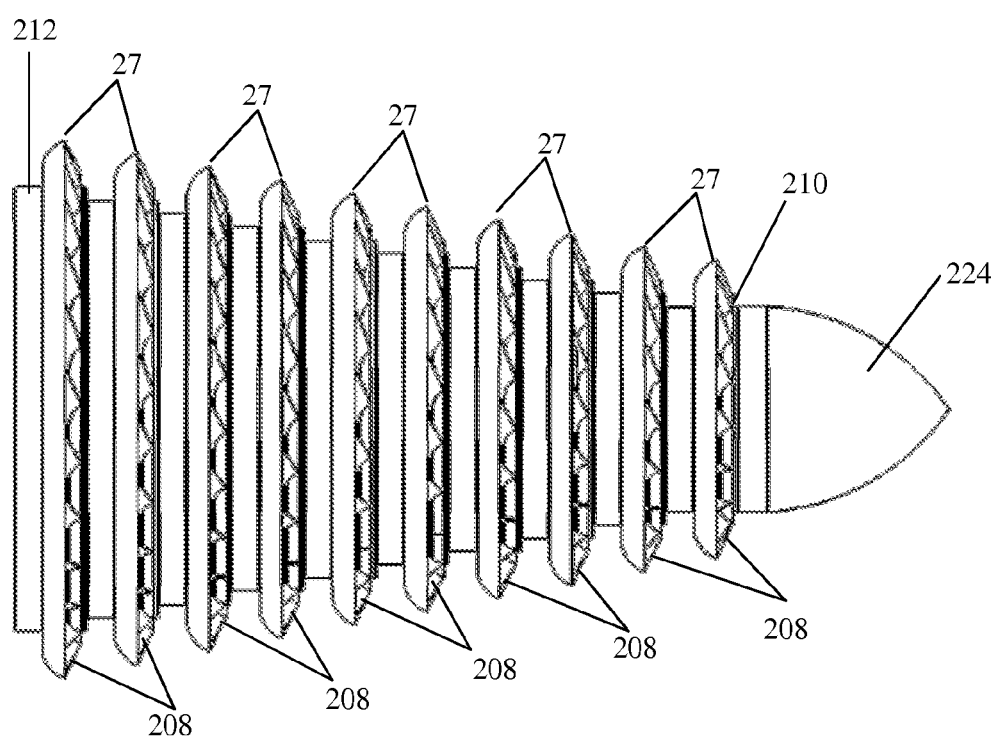
FIG. 8 is a side view of the assembly of rotors and stators shown in FIG. 7.
Figure 9:
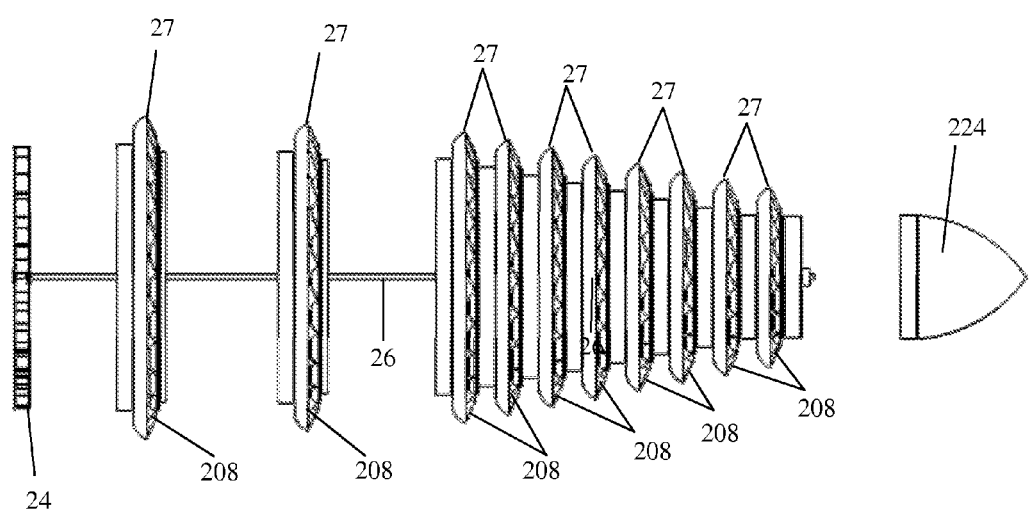
FIG. 9 is a partially exploded view of part of the assembly of rotors and stators shown in FIG. 7.
Figure 10:
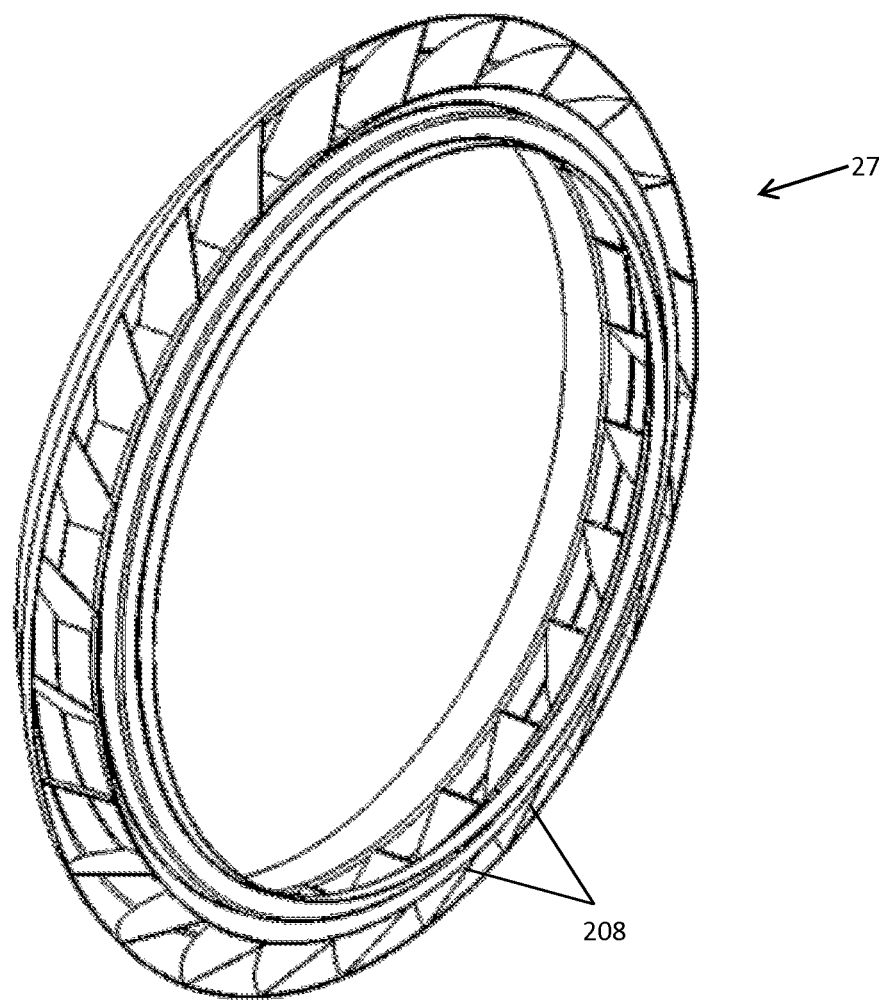
FIG. 10 is a perspective view of one of the stators in the embodiment of FIG. 6.
Figure 11:
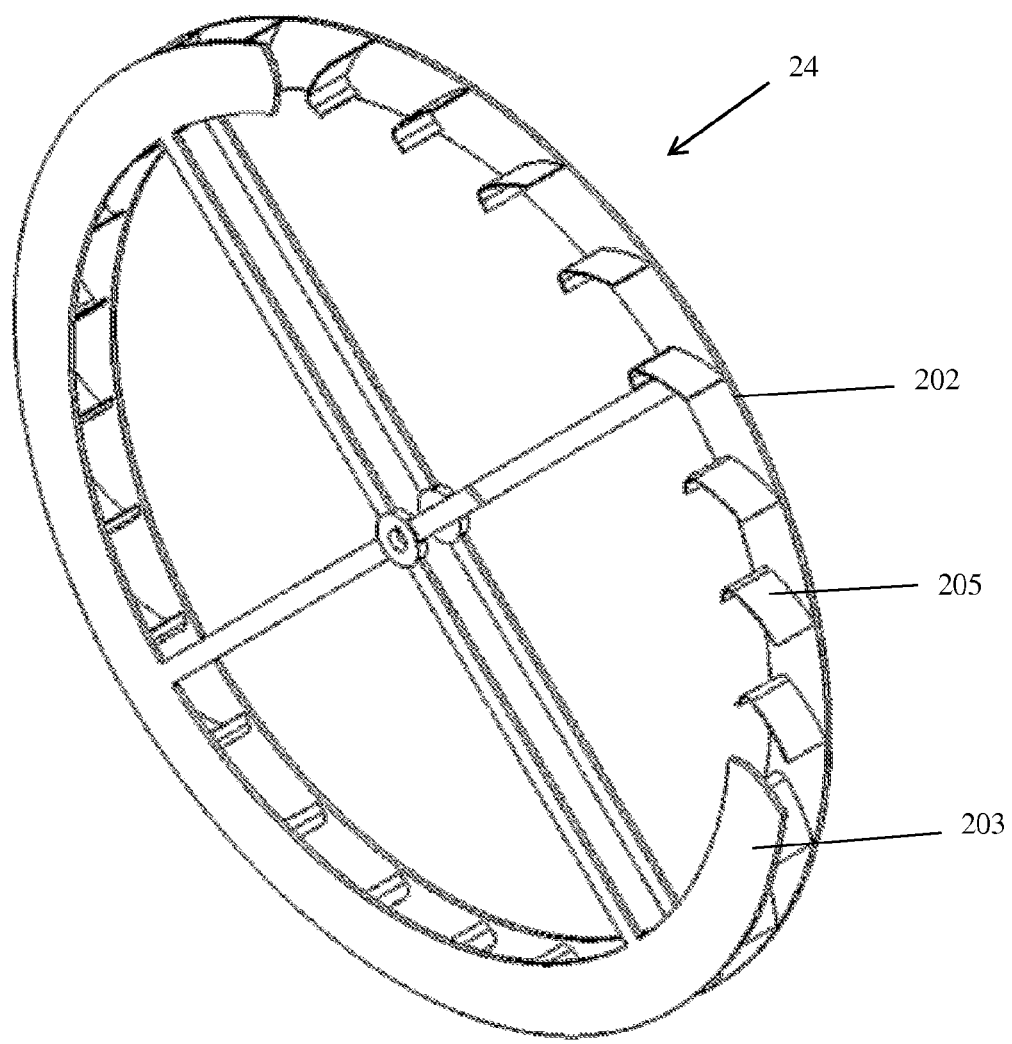
FIG. 11 is a perspective view of one of the rotors in the embodiment of FIG. 6.

The views of FIGS. 1 and 3 illustrate important concepts and structure of all embodiments of the present invention. More specifically, these figures illustrate a structure defining a blind annular chamber 120 surrounding a rotor assembly. The term "blind" corresponds to the more common term of "blind hole". This latter term is commonly used to refer to a hole that is reamed, drilled, or, milled in a workpiece without breaking through to the other side. In the case of the blind annular chamber formed by the generally cylindrical housings 106, 114 the annular space therebetween is closed on the left (as viewed) axial extremity, and open to receive incoming air at the right (as viewed) axial extremity. The terminology "double tunnel" refers to the respective generally cylindrical housings 106, 114. The conical member 124 directs incoming airflow, entering the outer cylindrical housing, from the right side as viewed toward the annular chamber 120. Air flow through the generally cylindrical housings 106 impacts the periphery of respective rotor wheels to cause rotation of the shaft 26.

The first embodiment has inner tunnel that is inside an outer tunnel. In the walls of the inner tunnel there is disposed a plurality of canals. More specifically, in the illustrated first embodiment there are 16 canals for each wheel, configured in such a way to direct the wind toward the sides of the wheels. These canals are assembled side by side to avoid loss of space and permit the free passage of wind. In a preferred embodiment each one of these 16 canals has the same size. Thus, the same amount of air will flow through the respective 16 canals toward the wheels.

Inside this inner tunnel there is a cylindrical envelope rotor assembly consisting of wheels that receive by means of the canals the force of the wind. The cylindrical envelope rotor assembly includes of a series of wheels carried on a horizontal axle which in turn is suspended by two bearings. The bearings may journal, ball or roller bearings in various embodiments.

In a preferred form of the first embodiment, each rotor wheel includes 16 air pockets disposed about the periphery thereof. Each has a series of air pockets or buckets (16 per rotor wheel in the preferred embodiment). Each air pocket is of equal size and depth and is configured to. Each wheel is balanced in order to minimize the amount of force necessary to rotate the rotor wheel 4 as well as the force necessary to keep the rotor wheel rotating.

Referring now to FIGS. 6-13 there is shown a second embodiment of the present invention that includes a shaft 26 to which are fixed a plurality of rotor wheels 24. The rotor wheels 24 are fixed to the shaft 26 at axially spaced intervals. Each rotor wheel 24 includes first and second opposed circular walls 202, 203 and a plurality of scoop members 205 carried between the opposed circular walls 202, 203 at angular intervals throughout the circumferential extent of each rotor wheel 24.

Figure 12:
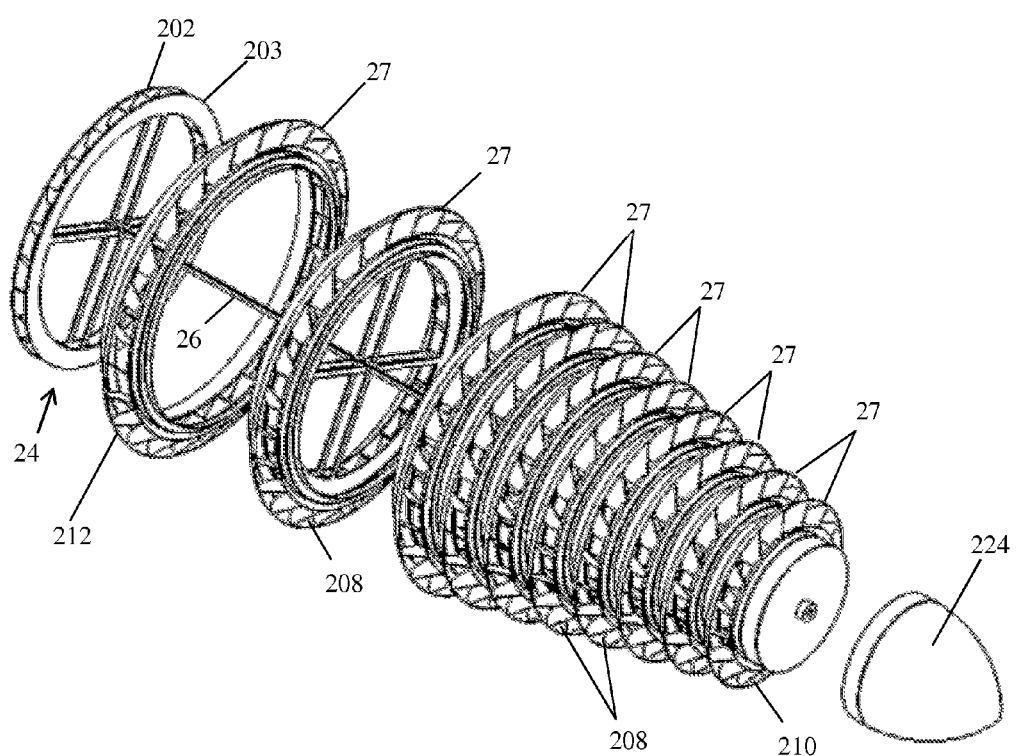
FIG. 12 is a perspective partially exploded view of the rotor and stator assembly in the embodiment of FIG. 6.
Figure 13:
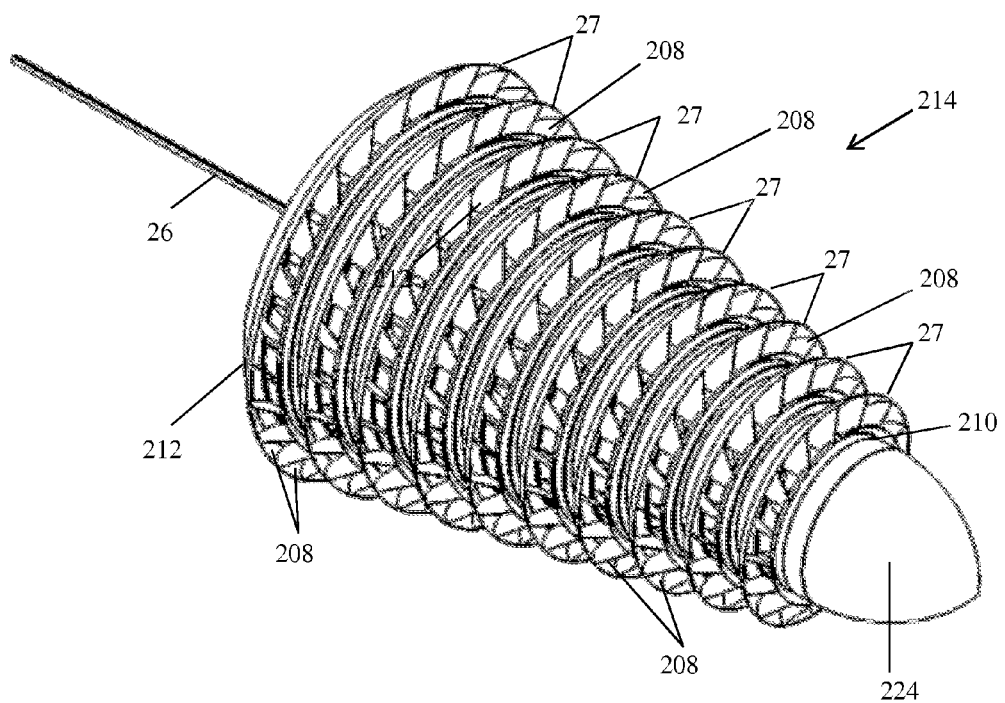
FIG. 13 is a perspective view of the rotor and stator assembly in the embodiment of FIG. 6.

A first or inner generally cylindrical housing 206 is disposed in concentric relationship with the periphery of the rotor wheels 24 and the elongated shaft 26. The first or inner generally cylindrical housing 206 comprises a plurality of side abutting stator members 27. In the cylindrical housing assembly each stator member 27 is fixed to other stator member 27 on opposed sides thereof. More particularly, adjacent stator members 27 are fixed together with sealing engagement therebetween. The only exceptions are the stator members 27 disposed at the axial extremities of the assembly. The assembly defines a first or inner tunnel. Within this inner tunnel, respective rotor wheels 24 are axially aligned with respective stators 27 as best seen in FIG. 12.

The assembly 206 of stator members 27 has a first axial extremity 210 and a second axial extremity 212. Each stator member 27 includes a plurality of cup shaped surfaces 208. Each cup shaped surface 208 is dimensioned and configured to align with the periphery of one of the rotor wheels 24 to deflect air and thereby cause rotation of the rotor wheel 24 assembly. In the illustrated second embodiment of the present invention the stator members 27 are progressively larger along the entire axial extent of the assembly with the smallest being at the first axial extremity 210 and the largest being at the second axial extremity 212.

A second or outer generally cylindrical housing 214 has a still greater diameter and is also disposed in substantially concentric relationship with the shaft 26 as well as the first or inner generally cylindrical housing 206. The second or outer generally cylindrical housing 214 has a first axial extremity 216 and a second axial extremity 218. The first or inner and second or outer generally cylindrical housings define an annular chamber 220 therebetween. The annular chamber 220 has a first axial extremity, proximate to the respective first axial extremities 210, 216 of the first and second generally cylindrical housings 206, 214, that is open for receiving ambient air flow and a second axial extremity proximate to the respective second axial extremities 212, 218 of the first and second cylindrical housings 206, 214 that is closed, whereby axial airflow into the annular chamber 220 is substantially directed in a radial direction by the cup shaped surfaces 208 toward the scoop members 205 carried on the rotor wheels 24 to cause rotation of the shaft 26.

In some embodiments of the present invention, the wind turbine apparatus has rotor wheels 24 having a structure at the geometric center thereof that includes a bore that allows passage of air flow from the scoop members 205 axially with respect to the axes of rotation of the rotor wheels 24. The wind turbine apparatus in the second embodiment has a first axial extremity 210 of the first generally cylindrical housing 206 that is closed to prevent airflow in or out of first axial extremity 210 of the first or inner generally cylindrical housing 206.

More specifically, the wind turbine apparatus has, in some embodiments, a first axial extremity 210 of the first generally cylindrical housing 206 that is closed by a conical member 224 that directs incoming airflow toward the annular chamber 120. In the illustrated embodiment the second axial extremity 112 of the first generally cylindrical housing 106 is open to allow airflow out of the first generally cylindrical housing 106.

The double tunnel wind turbine in accordance with the present invention is highly efficient because it utilizes all the impact of the force of wind with the purpose to move a generator to produce electric energy by channeling all the wind that enters in the turbine. The turbine consists of a primary principal tunnel that takes care of receiving the wind that enters it in one direction. Inside of this tunnel on the wall, there is a series of rudders or vanes that have the purpose of directing and circulating the wind in the direction toward many canals of the secondary tunnel and thereafter toward wheels. This tunnel uses all of the wind. No wind escapes this tunnel.

The secondary tunnel is inside the principal tunnel. On the walls of the secondary tunnel there is disposed a series of canals. More specifically, in the illustrated first embodiment there are 16 canals for each wheel, designed in such a way to direct the wind toward the sides of the wheels. These canals are assembled side by side to avoid loss of space and permit the free pass of wind and avoid any resistance of the wind. In a preferred embodiment each one of these 16 canals has the same size. Thus, the same amount of air will flow through the respective 16 canals toward the rotor wheels 4.

Inside this secondary tunnel is disposed a cylindrical envelope assembly consisting of wheels that receive by means of the canals the force of the wind. The cylindrical envelope assembly includes a series of wheels carried on a horizontal axle which in turn is suspended by two bearings. The bearings may journal, ball or roller bearings in various embodiments.

In a preferred form of the first embodiment, each rotor wheel includes 16 air pockets or buckets disposed about the periphery thereof. Each of the air pockets or buckets is uniformly dimensioned and configured in a preferred embodiment. Each rotor wheel 4 is balanced in order to minimize the amount of force necessary to initiate rotation as well as the force necessary to keep the rotor wheel assembly rotating.

The apparatus in accordance with the present invention will accommodate and utilize winds entering the entrance of the blind annular chamber that are precisely aligned with the axis thereof as well as wind in a direction that is oblique to the axis of the blind annular chamber. This contrasts with conventional horizontal axis wind turbines with long blades that utilize essentially only winds that are aligned with the axis of the conventional turbine. This gives the turbine in accordance with the present invention the capacity to develop more force and speed than the conventional turbines. Each rotor wheel has the center part open to permit the escape of wind toward the rear end of the turbine.

The design of this turbine permits dramatically the reduction of the size of the turbine and at the same time resolves the problems of localization of the turbine. This turbine is connected to a generator which produces electricity. At the same time it is connected to a battery and then to costumers.

Conventional horizontal wind turbines are inefficient due to the directional use of wind and loss of energy due to opposing forces of wind. In contrast the double tunnel wind turbine described here is a preferred apparatus to achieve a maximum efficiency of the force of the wind moving in a large number of directions simultaneously. The double tunnel wind turbine in accordance with the present invention is highly efficient because it utilizes all the impact of the force of wind with the purpose to move a generator to produce electric energy by channeling all the wind that enters in the turbine.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wind turbine apparatus which comprises:
   an elongated shaft;
   a plurality of rotor wheels fixed to said shaft at axially spaced intervals, each rotor wheel including first and second opposed circular walls and a plurality of scoop members carried between said opposed circular walls at angular intervals throughout the circumferential extent of each rotor wheel;
   a first generally cylindrical housing disposed in concentric relationship with the periphery of said rotor wheels and said elongated shaft, said first generally cylindrical housing having a first axial extremity and a second axial extremity and said first generally cylindrical housing comprising a plurality of passageways, each of said passageways being disposed in registered relationship with one of said rotor wheels; and
   a second generally cylindrical housing disposed outside of said first generally cylindrical housing as well as disposed in substantially concentric relationship with said shaft and said first generally cylindrical housing, said second generally cylindrical housing having a first axial extremity and a second axial extremity, and said first and second generally cylindrical housings having respective axial portions radially aligned and defining an annular chamber therebetween, said annular chamber having a first axial extremity, proximate to the respective first axial extremities of said first and second generally cylindrical housings, that is open for receiving ambient air flow and a second axial extremity proximate to the respective second axial extremities of said first and second cylindrical housings that is closed, whereby axial airflow into the annular chamber is substantially directed in a radial direction by said passageways, which are respective cup shaped surfaces, toward said scoop members carried on said rotor wheels to cause rotation of said shaft.

2. The wind turbine apparatus as described in claim 1 wherein:
each of said rotor wheels has structure at the geometric center thereof that allows passage of air flow from said scoop members axially with respect to the axes of rotation of said rotor wheels.

3. The wind turbine apparatus as described in claim 1 wherein:
said first axial extremity of said first generally cylindrical housing is closed to prevent airflow in or out of said first generally cylindrical housing.

4. The wind turbine apparatus as described in claim 3 wherein:
said first axial extremity of said first generally cylindrical housing is closed by a conical member that directs incoming airflow toward said annular chamber.

5. The wind turbine apparatus as described in claim 1 wherein:
said second axial extremity of said first generally cylindrical housing is open to allow airflow out of said first generally cylindrical housing.

6. A wind turbine apparatus which comprises:
an elongated shaft;
a plurality of rotor wheels fixed to said shaft at axially spaced intervals, each rotor wheel including first and second opposed circular walls and a plurality of scoop members carried between said opposed circular walls at angular intervals throughout the circumferential extent of each rotor wheel;
a first generally cylindrical housing disposed in concentric relationship with the periphery of said rotor wheels and said elongated shaft, said first generally cylindrical housing having a first axial extremity and a second axial extremity said first generally cylindrical housing including passageways, which include respective ports, dimensioned and configured to direct air flow toward respective rotor wheels; and
a second generally cylindrical housing disposed outside of said first generally cylindrical housing as well as disposed in substantially concentric relationship with said shaft and said first generally cylindrical housing, said second generally cylindrical housing having a first axial extremity and a second axial extremity, and said first and second generally cylindrical housings having respective axial portions radially aligned and defining an annular chamber therebetween, said annular chamber having a first axial extremity, proximate to the respective first axial extremities of said first and second generally cylindrical housings, that is open for receiving ambient air flow and a second axial extremity proximate to the respective second axial extremities of said first and second cylindrical housings that is closed, whereby axial airflow into the annular chamber is substantially directed in a radial direction by said passageways, which are respective cup shaped surfaces, toward said scoop members.

7. The wind turbine apparatus as described in claim 6 wherein:
each of said rotor wheels has structure at the geometric center thereof that allows passage of air flow from said scoop members axially with respect to the axes of rotation of said rotor wheels.

8. The wind turbine apparatus as described in claim 6 wherein:
said first axial extremity of said first generally cylindrical housing is closed to prevent airflow in or out of said first axial extremity of said first generally cylindrical housing.

9. The wind turbine apparatus as described in claim 6 wherein:
said first axial extremity of said first generally cylindrical housing is closed by a conical member that directs incoming airflow toward said annular chamber.

10. The wind turbine apparatus as described in claim 6 wherein:
said second axial extremity of said first generally cylindrical housing is open to allow airflow out of said first generally cylindrical housing.

11. The wind turbine apparatus as described in claim 6 wherein:
said first generally cylindrical housing comprises an assembly of axially adjacent cylindrical sections that are fixed together.

12. The wind turbine apparatus as described in claim 11 wherein:
all of said cylindrical sections have substantially identical outside diameters.

13. The wind turbine apparatus as described in claim 11 wherein
wherein the outside diameters of respective cylindrical sections progressively increase with the smallest being proximate said first axial extremity of said annular chamber and the largest being proximate the second axial extremity of said annular chamber.

14. The wind turbine apparatus as described in claim 6 wherein:
each rotor wheel has the same diameter.

15. The wind turbine apparatus as described in claim 11 wherein
a plurality of said cylindrical sections are dimensioned, configured and mounted to align with respective rotor wheels.

16. The wind turbine apparatus as described in claim 11 wherein each of a plurality of said cylindrical sections are dimensioned, configured and mounted to align with respective rotor wheels of said plurality of rotor wheels and said plurality of cylindrical sections are dimensioned and configured to define respective surfaces to deflect air and thereby cause the rotation of a rotor wheel.

17. A wind turbine apparatus which comprises:
an elongated shaft;
a plurality of rotor wheels fixed to said shaft at axially spaced intervals, each rotor wheel including a plurality of scoop members disposed at angular intervals throughout the circumferential extent of each rotor wheel;
a first generally cylindrical housing disposed in concentric relationship with the periphery of said rotor wheels and said elongated shaft, said first generally cylindrical housing having a first axial extremity and a second axial extremity and said first generally cylindrical housing comprising a plurality of passageways, each of said passageways being disposed in registered relationship with one of said rotor wheels; and
a second generally cylindrical housing surrounding at least an axial part of said first generally cylindrical housing, said second generally cylindrical housing having a first axial extremity and a second axial extremity, and said first and second generally cylindrical housings having respective axial portions radially aligned and defining an annular chamber therebetween, said annular chamber having a first axial extremity, proximate to the respective first axial extremities of said first and second generally cylindrical housings, that is open for receiving ambient air flow and a second axial extremity proximate to the respective second axial extremities of said first and second cylindrical housings that is closed, whereby axial airflow into the annular chamber is substantially directed in a radial direction by said passageways, which are respective cup shaped surfaces, toward said scoop members carried on said rotor wheels to cause rotation of said shaft.

18. The wind turbine apparatus as described in claim 17 wherein:
   each of said rotor wheels has structure at the geometric center thereof that allows passage of air flow from said scoop members axially with respect to the axes of rotation of said rotor wheels.

19. The wind turbine apparatus as described in claim 17 wherein:
   said first axial extremity of said first generally cylindrical housing is closed to prevent airflow in or out of said first generally cylindrical housing.

20. The wind turbine apparatus as described in claim 17 wherein:
   said first axial extremity of said first generally cylindrical housing is closed by a conical member that directs incoming airflow toward said annular chamber.

* * * * *